(12) United States Patent
Tanaka et al.

(10) Patent No.: US 9,792,737 B2
(45) Date of Patent: Oct. 17, 2017

(54) CONSTRUCTION MACHINE AND OPERATION STATE MANAGEMENT SYSTEM FOR THE SAME

(71) Applicant: Komatsu Ltd., Tokyo (JP)

(72) Inventors: Tsuyoshi Tanaka, Fujisawa (JP); Mitsuhiro Shimazu, Fujisawa (JP); Shinya Komori, Fujisawa (JP); Seiji Kamada, Chigasaki (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/759,939

(22) PCT Filed: Sep. 30, 2014

(86) PCT No.: PCT/JP2014/076186
§ 371 (c)(1),
(2) Date: Jul. 9, 2015

(87) PCT Pub. No.: WO2015/072238
PCT Pub. Date: May 21, 2015

(65) Prior Publication Data
US 2016/0093120 A1  Mar. 31, 2016

(51) Int. Cl.
*G07C 5/00* (2006.01)
*G06Q 50/08* (2012.01)
(Continued)

(52) U.S. Cl.
CPC ............ *G07C 5/008* (2013.01); *E02F 9/2054* (2013.01); *E02F 9/267* (2013.01);
(Continued)

(58) Field of Classification Search
CPC ...... G07C 5/008; G07C 5/0085; G06Q 50/08; G06Q 30/0645; E02F 9/267; E02F 9/2054
See application file for complete search history.

(56) References Cited

U.S. PATENT DOCUMENTS

2004/0199831 A1  10/2004  Shibata et al.
2011/0251751 A1*  10/2011  Knight ............... G07C 5/008
                                                    701/31.4
(Continued)

FOREIGN PATENT DOCUMENTS

CN     1552008 A     12/2004
CN     1723475 A     1/2006
(Continued)

OTHER PUBLICATIONS

International Search Report mailed Nov. 4, 2014, issued for PCT/JP2014/076186.
(Continued)

*Primary Examiner* — Aaron L Troost
(74) *Attorney, Agent, or Firm* — Locke Lord LLP

(57) ABSTRACT

An operation state management system for a construction machine includes a management apparatus configured to manage an operation state of the construction machine by communicating with the construction machine and a construction machine including a cumulative value storage device configured to store a cumulative value in which an amount of operation of the construction machine is accumulated and have an adjustment function to the stored cumulative value, an adjustment existence determining unit configured to determine whether the cumulative value stored in the cumulative value storage device has been adjusted, and a communication terminal apparatus configured to communicate with the management apparatus and transmit adjustment information indicating that at least the cumulative value has been adjusted to the management apparatus when the adjustment existence determining unit has determined that the adjustment has been performed.

8 Claims, 7 Drawing Sheets

(51) Int. Cl.
  *G06Q 30/06* (2012.01)
  *E02F 9/20* (2006.01)
  *E02F 9/26* (2006.01)
  *G07C 5/08* (2006.01)

(52) U.S. Cl.
  CPC ......... *G06Q 30/0645* (2013.01); *G06Q 50/08* (2013.01); *G07C 5/085* (2013.01)

(56) References Cited

U.S. PATENT DOCUMENTS

| | | | |
|---|---|---|---|
| 2011/0257831 A1 | 10/2011 | Shin | |
| 2015/0304406 A1* | 10/2015 | Penilla | G01C 21/26 709/203 |
| 2016/0055688 A1* | 2/2016 | Miura | G06Q 50/02 340/870.11 |

FOREIGN PATENT DOCUMENTS

| | | |
|---|---|---|
| CN | 102265301 A | 11/2011 |
| JP | 07-257331 A | 10/1995 |
| JP | 08-273015 A | 10/1996 |
| JP | 2002-091547 A | 3/2002 |
| JP | 2003-076416 A | 3/2003 |
| JP | 2003-085610 A | 3/2003 |
| JP | 2005-233119 A | 9/2005 |
| JP | 2010-164382 A | 7/2010 |
| JP | 2011-61991 A | 3/2011 |
| JP | 2014-070434 A | 4/2014 |
| KR | 10-1423138 B1 | 7/2014 |
| WO | WO-2005/043433 A1 | 5/2005 |

OTHER PUBLICATIONS

Office Action dated Jun. 30, 2017, issued for the Chinese patent application No. 201480004358.X and English translation thereof.

* cited by examiner

CONSTRUCTION MACHINE AND OPERATION STATE MANAGEMENT SYSTEM FOR THE SAME

FIELD

The present invention relates to a construction machine and an operation state management system for the same.

BACKGROUND

In recent years, a technique in which a management apparatus obtains and manages operation information of a construction machine such as an excavator or a dump truck has been known (for example, Patent Literature 1).

CITATION LIST

Patent Literature

Patent Literature 1: WO 2005/043433 A

SUMMARY

Technical Problem

When managing operation information of a construction machine, a management apparatus accumulates an amount of operation of the construction machine such as an operating time or a traveling distance of the construction machine, determines a timing of maintenance or service, and performs labor management of an operator of the construction machine. When an apparatus for counting the amount of operation is exchanged, the cumulative value of the amount of operation so far is input to a new apparatus. Therefore, there is an apparatus having a function to adjust the amount of operation. When the cumulative value of the amount of operation is wrongly input or when the cumulative value of the amount of operation is unnecessarily adjusted, there is a possibility that the cumulative value of the amount of operation cannot be correctly managed.

A purpose of the present invention is to manage a cumulative value of an amount of operation of a construction machine in a correct value.

Solution to Problem

According to the present invention, a construction machine comprises: a cumulative value storage device configured to store a cumulative value in which an amount of operation of the construction machine is accumulated and have an adjustment function to the stored cumulative value; an adjustment existence determining unit configured to determine whether the cumulative value stored in the cumulative value storage device has been adjusted; and a communication terminal apparatus configured to communicate with a management apparatus outside the construction machine and transmit adjustment information indicating that at least the cumulative value has been adjusted to the management apparatus when the adjustment existence determining unit has determined that the adjustment has been performed.

In the present invention, it is preferable that the communication terminal apparatus further transmits the number of times of the adjustment or a time when the adjustment has been performed.

In the present invention, it is preferable that the adjustment information is at least one of the cumulative value after the adjustment or a difference between a value after the cumulative value has been adjusted and a value before the cumulative value is adjusted.

In the present invention, it is preferable that the communication terminal apparatus includes a storage unit configured to store information on failures generated in the construction machine and makes the storage unit store at least the adjustment information.

In the present invention, it is preferable that when the cumulative value storage device obtains a limitation request instruction to limit the adjustment function to the cumulative value from the management apparatus, the cumulative value storage device turns off the adjustment function to the cumulative value.

In the present invention, it is preferable that when the cumulative value storage device obtains a limitation request instruction to limit the number of times to adjust the cumulative value from the management apparatus, the cumulative value storage device limits the number of times to adjust the cumulative value.

In the present invention, it is preferable that when the cumulative value storage device obtains a correction request instruction to correct the cumulative value to a value specified by the management apparatus from the management apparatus, the cumulative value storage device corrects the cumulative value stored in the cumulative value storage device to the specified value.

In the present invention, it is preferable that after the cumulative value storage device obtains the correction request instruction, the cumulative value storage device corrects the cumulative value to the specified value after a key switch of the construction machine has been turned OFF and turned ON again.

According to the present invention, a construction machine comprises: a cumulative value storage device configured to store a cumulative value in which an amount of operation of the construction machine is accumulated and have an adjustment function to the stored cumulative value; an adjustment existence determining unit configured to determine whether the cumulative value stored in the cumulative value storage device has been adjusted; and a communication terminal apparatus configured to communicate with a management apparatus outside the construction machine and transmit adjustment information indicating that at least the cumulative value has been adjusted to the management apparatus when the adjustment existence determining unit has determined that the adjustment has been performed, wherein when the cumulative value storage device obtains a limitation request instruction to limit the adjustment function to the cumulative value from the management apparatus, the cumulative value storage device turns off the adjustment function to the cumulative value, when the cumulative value storage device obtains a limitation request instruction to limit the number of times to adjust the cumulative value from the management apparatus, the cumulative value storage device limits the number of times to adjust the cumulative value, and when the cumulative value storage device obtains a correction request instruction to correct the cumulative value to a value specified by the management apparatus from the management apparatus, the cumulative value storage device corrects the cumulative value stored in the cumulative value storage device to the specified value.

In the present invention, it is preferable that a construction machine comprises: a cumulative value storage device configured to store a cumulative value in which an amount of operation of the construction machine is accumulated and have an adjustment function to the stored cumulative value; and a communication terminal apparatus configured to communicate with a management apparatus outside the construction machine, wherein when the cumulative value storage device obtains a limitation request instruction to limit the adjustment function to the cumulative value from the management apparatus, the cumulative value storage device turns off the adjustment function to the cumulative value.

In the present invention, it is preferable that a construction machine comprises: a cumulative value storage device configured to store a cumulative value in which an amount of operation of the construction machine is accumulated and have an adjustment function to the stored cumulative value; and a communication terminal apparatus configured to communicate with a management apparatus outside the construction machine, wherein when the cumulative value storage device obtains a correction request instruction to correct the cumulative value to a value specified by the management apparatus from the management apparatus, the cumulative value storage device corrects the cumulative value stored in the cumulative value storage device to the specified value.

In the present invention, it is preferable that an operation state management system for a construction machine comprises: a management apparatus configured to manage an operation state of a construction machine by communicating with the construction machine; and a construction machine including a cumulative value storage device configured to store a cumulative value in which an amount of operation of the construction machine is accumulated and have an adjustment function to the stored cumulative value, an adjustment existence determining unit configured to determine whether the cumulative value stored in the cumulative value storage device has been adjusted, and a communication terminal apparatus configured to communicate with the management apparatus and transmit adjustment information indicating that at least the cumulative value has been adjusted to the management apparatus when the adjustment existence determining unit has determined that the adjustment has been performed.

The present invention can manage a cumulative value of an amount of operation of a construction machine in a correct value.

DESCRIPTION OF EMBODIMENTS

Modes (embodiments) of the present invention will be described in detail with reference to the drawings.

<Outline of Management System 100>

Figure 1:
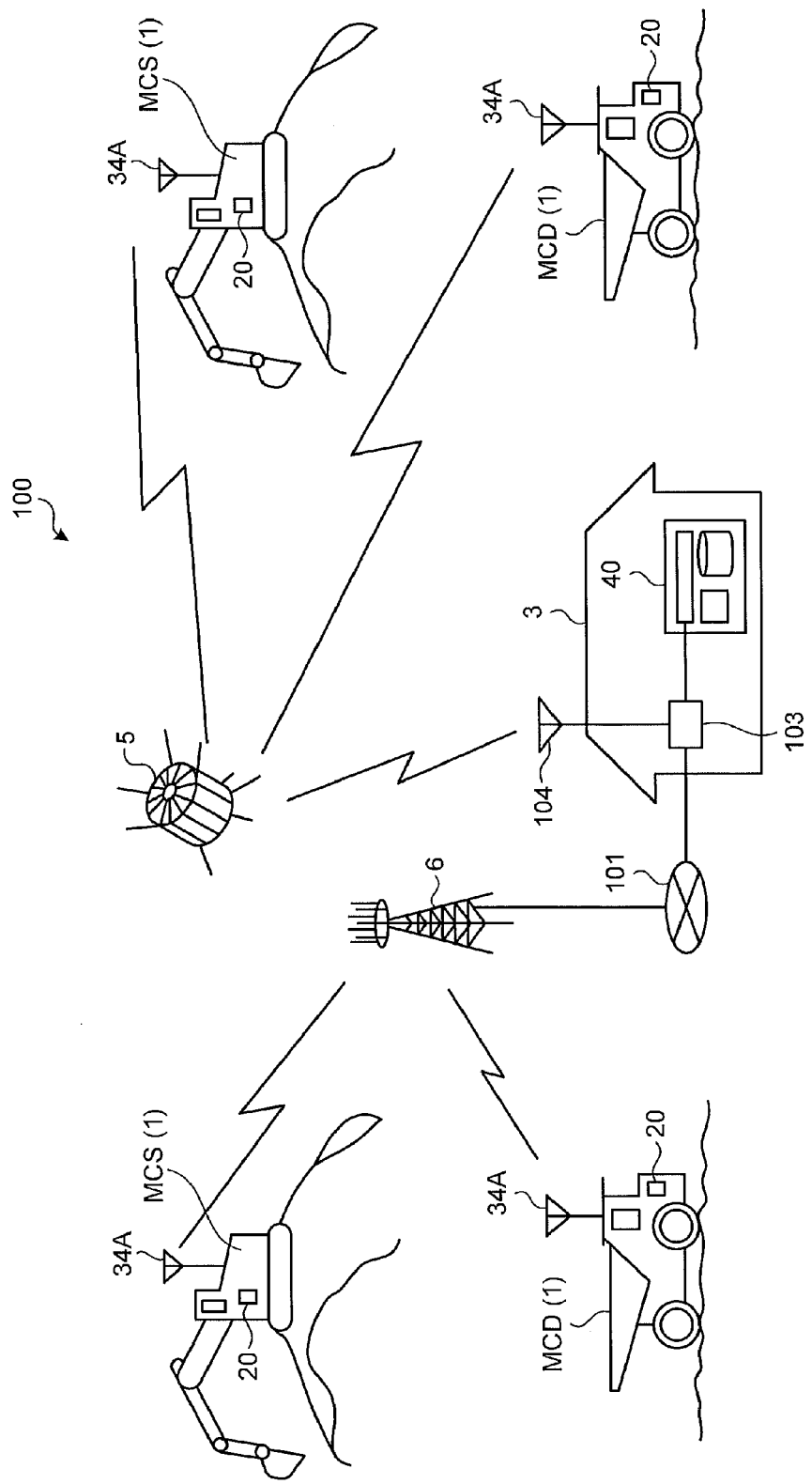
FIG. 1 is a diagram of an exemplary site where a management system for a construction machine according to the present embodiment is applied.

FIG. 1 is a diagram of an exemplary site where a management system 100 for a construction machine according to the present embodiment is applied. A management apparatus 40 collects operation information of a construction machine 1 via a communication line 101 or a communication satellite 5 by the operation state management system for the construction machine (appropriately referred to as management system below) 100. Also, the management system 100 allows an electronic device, a device controlled by the electronic device, and the like included in the construction machine 1 (referred to as electronic device and the like as necessary) to perform processing and changes a setting of the electronic device and the like.

In the example illustrated in FIG. 1, the management system 100 establishes communication between communication terminal apparatuses 20 of a dump truck MCD and an excavator MCS which are the construction machines 1 and the management apparatus 40 and collects the operation information of the construction machine 1. Also, the management system 100 allows the electronic device and the like of the construction machine 1 to perform some processing. In the present embodiment, the construction machine 1 is not limited to the dump truck MCD and the excavator MCS. For example, the management system 100 may manage a wheel loader, a bulldozer, a forklift, or the like. In the following description, the dump truck MCD and the excavator MCS are referred to as the construction machine 1 as necessary.

In the management system 100, for example, the management apparatus 40 communicates with the communication terminal apparatus 20 included in the construction machine 1 via a radio communication system applied to a mobile communication such as a mobile phone, a wireless local area network (LAN), or a satellite communication line using the communication satellite 5. The management apparatus 40 is installed, for example, in a management facility 3. The management facility 3 may be provided in the site where the construction machine 1 operates. Also, the management facility 3 may be provided in a place far from the site where the construction machine 1 operates, for example, a place where a serviceman or a manager of the site for performing preventive maintenance of the construction machine 1 and the like stays. Also, the management apparatus 40 may be installed in a predetermined place and may be movable to an arbitrary place as a mobile terminal including a radio communication function.

In the present embodiment, the management apparatus 40 communicates with the communication satellite 5 via a communication apparatus 103 and a satellite communication antenna 104 connected to the communication apparatus 103. The management apparatus 40 communicates with and exchanges various information with the communication terminal apparatus 20 included in the construction machine 1 via the satellite communication line using the communication satellite 5. Also, the management apparatus 40 can exchange various information with the communication terminal apparatus 20 included in the construction machine 1 via the communication apparatus 103, the communication line 101 connected to the communication apparatus 103, and a base station 6 connected to the communication line 101.

The communication terminal apparatus 20 included in the construction machine 1 receives (obtains) a processing request instruction from the management apparatus 40 and transmits the operation information of the construction machine 1 and various information or a signal for responding to the processing request instruction to the management apparatus 40. The communication terminal apparatus 20 transmits information from a communication antenna 34A to the outside. The management apparatus 40 receives (obtains) various information transmitted from the communication terminal apparatus 20 of the construction machine 1 via the base station 6, the communication line 101, and the communication apparatus 103. The processing request instruction from the management apparatus 40 includes processing for making the communication terminal apparatus 20 perform processing in which the communication terminal apparatus 20 of the construction machine 1 can establish the communication with the management apparatus 40.

The management apparatus 40 requests the electronic device and the like included in the construction machine 1 to perform the processing and changes the setting of the function of the electronic device and the like. In this case, the management apparatus 40 transmits a command or information to be transmitted to the construction machine 1 to the communication satellite 5 or the communication line 101 via the communication apparatus 103. The command or information is transmitted from the communication satellite 5 or the base station 6 to the construction machine 1 in a form of radio waves. The communication antenna 34A of the construction machine 1 receives the radio waves including the above-mentioned command or information transmitted from the base station 6.

The communication terminal apparatus 20 of the construction machine 1 changes the radio waves received by the communication antenna 34A into the original information which can be read by a processing unit 20C of the communication terminal apparatus 20 to be described by decoding and converting the radio waves. In this way, the construction machine 1, more specifically, the communication terminal apparatus 20 and the management apparatus 40 can exchange the information with each other via the radio communication. Next, the construction machine 1, the management apparatus 40, and the management system 100 will be described in detail.

<Details of Management System 100>

Figure 2:
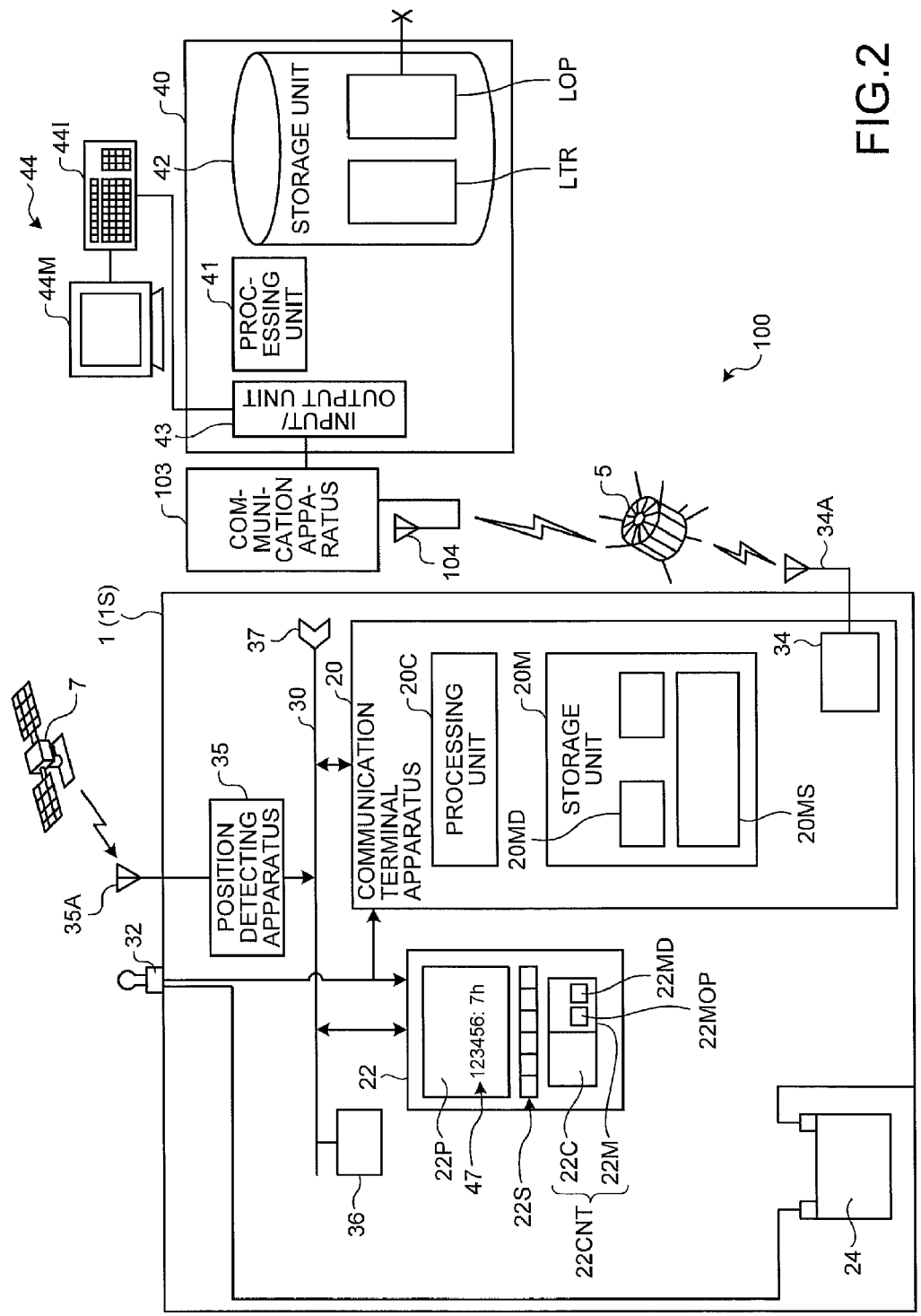
FIG. 2 is a diagram of an exemplary management system for the construction machine according to the present embodiment.
Figure 3:
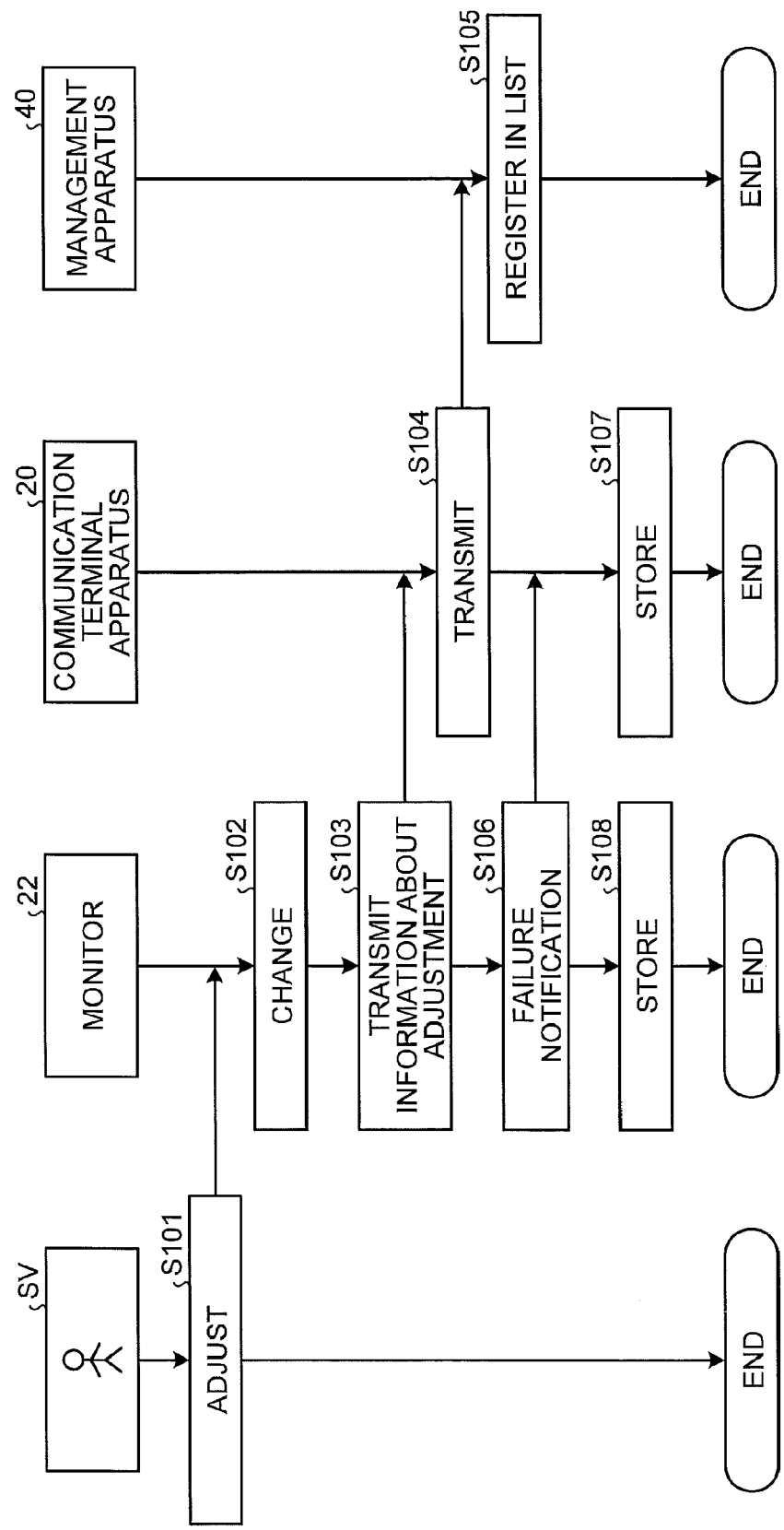
FIG. 3 is a flowchart of a processing procedure of processing in a case where a cumulative value has been adjusted by using a monitor.

FIG. 2 is a diagram of an exemplary management system 100 for the construction machine according to the present embodiment. FIG. 3 a diagram of an exemplary monitor 22 included in the construction machine 1. FIG. 2 is an example in a case where a work machine 1 and the management apparatus 40 communicate and exchange various information with each other via the satellite communication line. However, as illustrated in FIG. 1, the work machine 1 may communicate with the management apparatus 40 by the radio communication system applied to the mobile communication such as the mobile phone. The management system 100 of the construction machine includes the management apparatus 40 included in the management facility 3 and an onboard system 1S included in the construction machine 1. An example will be described below in which the management apparatus 40 and the onboard system 1S exchange information with each other via the communication apparatus 103 and the communication satellite 5. However, the information may be exchanged via the base station 6 and the communication line 101 illustrated in FIG. 1. In this case, the communication line 101 may be the radio communication system applied to the mobile communication such as the mobile phone.

In the management system 100, the communication terminal apparatus 20 of the onboard system 1S receives the command or information transmitted from the management apparatus 40 via the communication satellite 5. The communication terminal apparatus 20 executes the received command and, for example, performs the processing for establishing the communication with the management apparatus 40. Also, the communication terminal apparatus 20 collects the operation information of the construction machine 1 and transmits the operation information to the management apparatus 40 at a predetermined timing. In addition, the communication terminal apparatus 20 transmits the received command or information to the electronic device and the like of the construction machine 1 via a signal line 30 included in the onboard system 1S and makes the electronic device execute the above-mentioned command.

In the present embodiment, for convenience of description, a single construction machine 1, a single onboard system 1S, and a single management apparatus 40 are connected to each other via the communication line 101. However, the number of the construction machines 1 and that of the management apparatuses 40 are not limited. Next, the onboard system 1S will be described.

(Onboard System 1S)

The onboard system 1S includes the communication terminal apparatus 20, the monitor 22, a position detecting apparatus 35, and various control apparatuses 36. These are the electronic devices included in the construction machine 1 and electrically connected to the signal line 30 included in the construction machine 1. The electronic device included in the construction machine 1 is referred to as an onboard electronic device as necessary. The electronic devices connected to the signal line 30 can communicate with each other. The signal line 30 included in the construction machine 1 is referred to as an in-vehicle signal line 30 below as necessary. The in-vehicle signal line 30 is, for example, a controller area network (CAN). However, it is not limited to the CAN. The onboard electronic device included in the construction machine 1 and connected to the in-vehicle signal line 30 is not limited to the above-described one.

The communication terminal apparatus 20 has a communication function, for example, a function for performing the radio communication with the management apparatus 40 and exchanging the information. The communication terminal apparatus 20 includes the processing unit 20C, a storage unit 20M, and a communication unit 34. The processing unit 20C is, for example, a central processing unit (CPU). The storage unit 20M is, for example, a random access memory (RAM), a read only memory (ROM), a flash memory, or a combination of those. The storage unit 20M stores a computer program in which the command of the processing performed by the communication terminal apparatus 20 is written and necessary information for the above-mentioned processing.

The storage unit 20M includes a spooler 20MS and a failure storage unit 20MD. The spooler 20MS is a part of the storage unit 20M and temporarily stores the information transmitted from the onboard electronic device other than the communication terminal apparatus 20 via the in-vehicle signal line 30 or the information transmitted from the management apparatus 40. The failure storage unit 20MD is a part of the storage unit 20M and stores information on failures generated in the construction machine 1. The failure storage unit 20MD accumulates and holds the information on failures. The information on failures is collected by the communication terminal apparatus 20 via the in-vehicle signal line 30. The information on failures includes a kind and date of the failure.

The communication unit 34 includes a modem and the communication antenna 34A. The communication unit 34 performs the radio communication, specifically, the satellite communication with the communication satellite 5. The communication unit 34 can exchange information with the management apparatus 40 via the communication satellite 5 and the communication apparatus 103. In the present embodiment, the communication terminal apparatus 20 and the management apparatus 40 communicate and exchange information with each other via the satellite communication. However, as described above, the communication terminal apparatus 20 and the management apparatus 40 may exchange information with each other via the radio communication system applied to the mobile communication such as the mobile phone.

The communication unit 34 has been started even when a key switch 32 is turned OFF. The key switch 32 will be described in detail below. That is, even when the key switch 32 is turned OFF, the communication function of the communication terminal apparatus 20 is enabled. Therefore, when receiving the instruction from the management apparatus 40, the communication unit 34 can start the processing unit 20C by supplying the power of the processing unit 20C from a storage battery 24. In this case, the communication satellite 5 may retry the transmission of the instruction to the communication unit 34 at predetermined intervals until the communication unit 34 receives the above-mentioned instruction. Also, when the key switch 32 is turned OFF, the communication unit 34 can communicate with the management apparatus 40 by repeating the power supply and interruption of the power supply from the storage battery 24 to the communication terminal apparatus 20 at predetermined time intervals. The communication terminal apparatus 20 to which the power is supplied when the key switch 32 is turned OFF can transmit the operation information of the construction machine 1 to the management apparatus 40.

The monitor 22 is a display device for functioning as an input device which displays various information about the construction machine 1 on a screen 22P, inputs an ID number and the like, and adjusts the amount of operation of the construction machine 1. The amount of operation will be described below. In the example illustrated in FIG. 2, a cumulative operating time 47 of the construction machine 1 is displayed on the screen 22P. Information displayed on the screen 22P is not limited to the cumulative operating time 47. Information regarding the operation state of the construction machine 1 such as a remaining amount of a fuel of the construction machine 1, a rotation speed of an engine, which is not shown, included in the construction machine 1, and a cooling water temperature of the engine is displayed. The monitor 22 is installed in a cab of the construction machine 1 which is not shown.

Since the monitor 22 functions as the input device, the monitor 22 includes an input switch 22S in a lower part of the screen 22P. The input switch 22S may be located in a place other than the lower part of the screen 22P and may be separated from the screen 22P. When the input switch 22S is separated from the screen 22P, the input switch 22S may be provided in a console in the cab which is not shown. In the present embodiment, a plurality of push-button input switches 22S is arranged in the lower part of the screen 22P and in a lateral direction. An operator of the construction machine 1 operates the input switch 22S. According to this, images displayed on the screen 22P of the monitor 22 can be switched, and the construction machine 1 can perform the processing. Also, various settings regarding the operation of the construction machine 1 can be changed, and settings of various electronic devices included in the construction machine 1 can be changed.

The monitor 22 is, for example, a liquid crystal display device. However, the monitor 22 is not limited to this. The monitor 22 functions as an input device. However, in order to make the monitor 22 perform the function as the input device, a touch panel may be included on the screen 22P of the monitor 22.

The monitor 22 includes a control apparatus 22CNT to realize various functions of the monitor 22. The control apparatus 22CNT includes a processing unit 22C and a storage unit 22M. The processing unit 22C is, for example, a CPU. The storage unit 22M is, for example, a RAM, a ROM, a flash memory, or a combination of these.

The storage unit 22M stores the computer program in which the command of the processing performed by the processing unit 22C is written and necessary information for the above-mentioned processing. The storage unit 22M includes an amount of operation storage unit 22MOP and a failure storage unit 22MD. The amount of operation storage unit 22MOP is a part of the storage unit 22M and stores the cumulative value of the amount of operation of the construction machine 1. The failure storage unit 22MD is a part of the storage unit 22M and stores information on failures generated in the construction machine 1. The failure storage unit 22MD accumulates and holds the information on failures. In the present embodiment, the monitor 22 communicates with the communication terminal apparatus 20 via the in-vehicle signal line 30. The amount of operation storage unit 22MOP and the failure storage unit 22MD are, for example, non-volatile memories.

An operating time which is a time of an operation of the construction machine 1, a traveling distance of the construction machine 1, a fuel injection amount to an engine included in the construction machine 1, a loading amount of a cargo when the construction machine 1 is a dump truck, and a loading amount which is an amount of earth and sand carried by a bucket when the construction machine 1 is an excavator are exemplified as the amount of operation of the construction machine 1. The amount of operation of the construction machine 1 is not limited to the exemplified amounts. For example, the traveling distance of the construction machine 1 includes both a traveling distance in a case where the construction machine 1 moves forward and that in a case where the construction machine 1 moves backward. The amount of operation and the cumulative value of the amount of operation are the operation information of the construction machine 1.

The cumulative operating time 47 displayed on the screen 22P of the monitor 22 is the cumulative value of the operating time which is the amount of operation of the construction machine 1. In the present embodiment, the cumulative operating time 47 is displayed on the screen 22P of the monitor 22 as the cumulative value of the amount of operation. However, a cumulative value of any exemplified amounts of operation may be displayed on the screen 22P. Also, a kind of the amount of operation of which the cumulative value is displayed may be switched by the input switch 22S.

The monitor 22 is a cumulative value storage device which can adjust the cumulative value of the amount of operation of the construction machine 1 stored in the amount of operation storage unit 22MOP. The cumulative value storage device may be separated from the monitor 22. The serviceman of the construction machine 1 can adjust the cumulative value of the amount of operation of the construction machine 1 stored in the amount of operation storage unit 22MOP to a value different from the cumulative value of the amount of operation stored in the amount of operation storage unit 22MOP at the present moment. The input switch 22S of the monitor 22 is used for the adjustment. In order to adjust the cumulative value of the amount of operation, the serviceman inputs, for example, a particular personal identification number from the input switch 22S and displays a menu screen to adjust the cumulative value of the amount of operation on the screen 22P of the monitor 22. Then, the serviceman adjusts the cumulative value of the amount of operation to a value different from that of the present moment.

A terminal 37 is electrically connected to the in-vehicle signal line 30. By connecting, for example, an inspection device to the terminal 37, diagnosis on the states of the communication terminal apparatus 20, the monitor 22, the position detecting apparatus 35, and various control apparatuses 36 can be made, and the information stored in the storage unit 20M of the communication terminal apparatus 20 and the storage unit 22M of the monitor 22 can be rewritten and read. As the inspection device, for example, a terminal device such as a personal computer in which a dedicated tool or dedicated application is installed can be used.

The communication terminal apparatus 20 and the management apparatus 40 can exchange information via the radio communication. However, the mode of the information exchange between the communication terminal apparatus 20 and the management apparatus 40 is not limited to this. Information exchange between the communication terminal apparatus 20 and the management apparatus 40 may be a mode in which the operation information and the like are output to outside the communication terminal apparatus 20 and various information is transmitted from the management apparatus 40 to the communication terminal apparatus 20, for example, by connecting a terminal device such as a personal computer to the terminal 37 via the communication cable. The operation information and the like may be transmitted from the terminal device to the management apparatus 40 and various information and the like may be transmitted from the management apparatus 40 to the above-mentioned terminal device by connecting the terminal device to the management apparatus 40 via wired or wireless communication. The cumulative value of the amount of operation stored in the amount of operation storage unit 22MOP of the monitor 22 may be adjusted via the terminal device connected to the terminal 37.

The key switch 32 is provided near a driver seat provided in the construction machine 1. The power from the storage battery 24 is supplied to the onboard electronic device via the key switch 32. The storage battery 24 is a power supply included in the construction machine 1. When the key switch 32 is turned ON, the power is supplied from the storage battery 24 to the onboard electronic device. When the key switch 32 is turned OFF, the power to be supplied from the storage battery 24 to the onboard electronic device is interrupted. In this way, the key switch 32 is provided between the storage battery 24 and the onboard electronic device and interrupts the power to be supplied from the storage battery 24 to the onboard electronic device. The key switch 32 may have a form operated by inserting an ignition key in a switch and may be a form operated by a push button. In this way, the key switch 32 may be in any form in the present embodiment.

The position detecting apparatus 35 detects a current position of the construction machine 1 by using a real time kinematic-global navigation satellite systems (RTK-GNSS). An antenna 35A is electrically connected to the position detecting apparatus 35. The antenna 35A is a GNSS antenna. A signal corresponding to GNSS radio waves received from a RTK-GNSS satellite 7 by the antenna 35A is input to the position detecting apparatus 35. The position detecting apparatus 35 detects an installation position of the antenna 35A. The installation position of the antenna 35A detected by the position detecting apparatus 35 indicates a position of the construction machine 1. The position detecting apparatus 35 includes, for example, a three-dimensional position sensor. The position detecting apparatus 35 may be built into the communication terminal apparatus 20.

The various control apparatuses 36 include an engine control apparatus for controlling an engine, which is not shown, included in the construction machine 1, a pump control apparatus for controlling a hydraulic pump which is not shown, and a brake control apparatus for controlling a braking device which is not shown. However, the control apparatus 36 is not limited to these.

The communication terminal apparatus 20 obtains position information of the construction machine 1 from the position detecting apparatus 35 during an operation of the construction machine 1 and stores it in the storage unit 20M as one of the operation information of the construction machine 1. Also, the communication terminal apparatus 20 obtains information about the state of the construction machine 1 (operation information) from various sensors of the construction machine 1 as the operation information of the construction machine 1 and stores it in the storage unit 20M. The information about the state of the construction machine 1 includes the amount of operation of the construction machine 1, the rotation speed of the engine, a cooling water temperature, a temperature of exhaust gas, a pressure of working oil ejected from the hydraulic pump, and a temperature state of the working oil. The communication terminal apparatus 20 transmits the obtained operation information to the management apparatus 40 periodically, for example, once a day. Also, the communication terminal apparatus 20 transmits requested information to the management apparatus 40 and performs the requested command according to the request from the management apparatus 40.

The communication terminal apparatus 20 obtains the cumulative value of the amount of operation stored in the amount of operation storage unit 22MOP of the monitor 22 together with other operation information via the in-vehicle signal line 30 and temporarily stores it in the spooler 20MS. For example, at the end of the day, the communication terminal apparatus 20 reads the cumulative value of the operation information together with the other operation information from the spooler 20MS and transmits it to the management apparatus 40. The management apparatus 40 writes the received cumulative value of the operation information in an operation information list LTR of a storage unit 42 together with the other operation information. In this way, the cumulative value of the operation information is periodically transmitted from the communication terminal apparatus 20 to the management apparatus 40. In the present embodiment, the number of the transmittance of the cumulative value of the operation information from the communication terminal apparatus 20 to the management apparatus 40 is, for example, once a day.

(Management Apparatus 40)

The management apparatus 40 obtains the operation information of the construction machine 1 from the communication terminal apparatus 20 of the construction machine 1 and manages the operation state of the construction machine 1. In the present embodiment, the management apparatus 40 manages one or more construction machines 1. However, the number of the construction machines 1 managed by the management apparatus 40 is not limited.

The management apparatus 40 includes a processing unit 41, a storage unit 42, and an input/output unit 43. The processing unit 41 is, for example, a CPU. The storage unit 42 is, for example, a RAM, a ROM, a flash memory, a hard disk drive, or a combination of these. The processing unit 41 transmits various commands to the communication terminal apparatus 20 of the construction machine 1 via the communication apparatus 103. The input/output unit 43 inputs/outputs information between the communication apparatus 103 connected to the management apparatus 40 and the processing unit 41 and inputs/outputs information between an input/output device 44 and the processing unit 41.

The storage unit 42 stores an in-processing list LOP and the operation information list LTR. Information indicating that processing of the communication terminal apparatus 20 included in the construction machine 1 is in progress is written in the in-processing list LOP. When the processing of the communication terminal apparatus 20 is completed, the information written in the in-processing list LOP is deleted. The operation information of the construction machine 1 including the cumulative value of the amount of operation of the construction machine 1 is written in the operation information list LTR. The state of the construction machine 1 is grasped by referring to the operation information written in the operation information list LTR.

The communication apparatus 103 is electrically connected to the input/output unit 43 in the management apparatus 40. The antenna 104 for performing the radio communication with the communication satellite 5 is electrically connected to the communication apparatus 103. The management apparatus 40, more specifically, the processing unit 41 of the management apparatus 40 transmits various information including various commands to the communication terminal apparatus 20 of the construction machine 1 via the communication apparatus 103, the antenna 104, and the communication satellite 5. Also, the processing unit 41 of the management apparatus 40 receives various information transmitted from the communication terminal apparatus 20 of the construction machine 1 via the communication satellite 5 and the communication apparatus 103. Also, the processing unit 41 transmits the command, information, or the like to the construction machine 1 via the communication apparatus 103 and the communication line 101.

The input/output device 44 connected to the input/output unit 43 includes a management-side display device 44M and a management-side input device 44I. The management-side input device 44I inputs a command to the processing unit 41 of the management apparatus 40. The command is to make the management apparatus 40 perform various processing. The management-side input device 44I can make the communication terminal apparatus 20 perform the above-mentioned processing by transmitting the command to make the communication terminal apparatus 20 of the construction machine 1 perform various processing via the management apparatus 40 and the satellite communication.

Regarding the cumulative value of the amount of operation stored in the amount of operation storage unit 22MOP of the monitor 22, for example, when the monitor 22 is exchanged to a new monitor 22 due to a failure and the like, the cumulative value of the amount of operation stored in the new monitor 22 is adjusted to the cumulative value of the amount of operation stored in the monitor 22 before the exchange by a predetermined work by a serviceman and the like. After that, the cumulative value of the amount of operation stored in the amount of operation storage unit 22MOP of the new monitor 22 is transmitted from the communication terminal apparatus 20 to the management apparatus 40 and written in the operation information list LTR of the storage unit 42. When the cumulative value of the amount of operation stored in the new monitor 22 is adjusted to a wrong value, the wrong cumulative value is written in the operation information list LTR of the storage unit 42. As a result, there is a possibility that the management apparatus 40 cannot correctly manage the cumulative value of the amount of operation. Also, even when the monitor 22 is not exchanged, there may be a case where the cumulative value of the amount of operation stored in the monitor 22 is intentionally changed. In this case, there is a possibility that the management apparatus 40 cannot correctly manage the cumulative value of the amount of operation.

Therefore, in the present embodiment, when the cumulative value of the amount of operation stored in the amount of operation storage unit 22MOP of the monitor 22, more specifically, the storage unit 22M is adjusted, the communication terminal apparatus 20 transmits adjustment information indicating that the cumulative value of the amount of operation has been adjusted and an adjusted time to the management apparatus 40 preferably every time when the cumulative value is adjusted. The communication terminal apparatus 20 may transmit the adjustment information indicating that at least the cumulative value of the amount of operation has been adjusted to the management apparatus 40. The adjustment information includes at least one of a value after the cumulative value of the amount of operation has been adjusted and a difference between the cumulative values of the amounts of operation. The difference between the cumulative values of the amounts of operation is a difference between a value after the cumulative value of the amount of operation has been adjusted and a value before the cumulative value of the amount of operation is adjusted. In this way, when the cumulative value of the amount of operation is adjusted, the adjustment information and the adjusted time are transmitted to the management apparatus 40. Therefore, the management apparatus 40 can recognize that the cumulative value of the amount of operation has been adjusted. As a result, the cumulative value of the amount of operation stored in the monitor 22 can be corrected to a correct value by quickly recognizing that the cumulative value of the amount of operation has been adjusted to a wrong value and according to a method to be described. When the adjustment information and the adjusted time are transmitted to the management apparatus 40 every time when the cumulative value of the amount of operation is adjusted, the management apparatus 40 can surely recognize that the cumulative value of the amount of operation has been adjusted. Next, exemplary processing will be described which is performed by the communication terminal apparatus 20 and the monitor 22 in a case where the cumulative value of the amount of operation of the monitor 22 has been adjusted.

<First Exemplary Processing in a Case where the Cumulative Value of the Amount of Operation has been Adjusted by Using the Monitor 22>

FIG. 3 is a flowchart indicating a processing procedure of processing in a case where the cumulative value has been adjusted by using the monitor 22. A serviceman SV adjusts in step S101 the cumulative value of the amount of operation by using the monitor 22 illustrated in FIG. 2. The processing unit 22C of the monitor 22 which is an adjustment existence determining unit determines in step S102 whether the cumulative value of the amount of operation has been adjusted. When the processing unit 22C has determined that the cumulative value of the amount of operation has been adjusted, the processing unit 22C changes the cumulative value of the amount of operation stored in the amount of operation storage unit 22MOP of the storage unit 22M to the adjusted value. When the processing unit 22C has determined that the cumulative value of the amount of operation has not been adjusted, the processing is terminated. In the present embodiment, the number of times when the cumulative value of the amount of operation is adjusted (referred to as the number of times of cumulative adjustment as necessary) is stored in the failure storage unit 22MD. The processing unit 22C of the monitor 22 adds one to the number of times of cumulative adjustment when the cumulative value of the amount of operation is adjusted.

The processing unit 22C of the monitor 22 obtains a difference between the cumulative values of the amounts of operation by calculating a difference between the value after the cumulative value of the amount of operation has been adjusted and the value before the cumulative value of the amount of operation is adjusted. The difference between the cumulative values of the amounts of operation will be referred to as "cumulative value difference" below as necessary. The cumulative value difference corresponds to an amount in which the cumulative value of the amount of operation has been adjusted (referred to as "adjusted amount" below as necessary). Also, the processing unit 22C obtains an adjusted amount cumulative value which is a value obtained by adding the adjusted amounts so far. The failure storage unit 22MD stores the adjusted amount and the adjusted amount cumulative value.

In step S103, the processing unit 22C notifies the communication terminal apparatus 20 of the cumulative value of the amount of operation after the adjustment, the adjusted amount, the adjusted amount cumulative value, and the number of times of cumulative adjustment as "information about the adjustment". It is preferable that the communication terminal apparatus 20 be notified of at least one of the cumulative value of the amount of operation after the adjustment and the adjusted amount. Next, in step S104, the communication terminal apparatus 20 which has obtained information about the adjustment via the in-vehicle signal line 30 transmits at least adjustment information to the management apparatus 40, the cumulative value of the amount of operation after the adjustment, the adjusted amount, the adjusted amount cumulative value, and the number of times of cumulative adjustment to the management apparatus 40 being included as "adjustment information". The adjustment information is information indicating that the cumulative value has been adjusted. In this way, the communication terminal apparatus 20 transmits at least the adjustment information to the management apparatus 40 when the processing unit 22C of the monitor 22 which is the adjustment existence determining unit has determined that the cumulative value of the amount of operation has been adjusted.

In step S104, the communication terminal apparatus 20 may transmit a time when the cumulative value of the amount of operation has been adjusted to the management apparatus 40 in addition to the adjustment information. In the present embodiment, it is assumed that a time when the cumulative value of the amount of operation has been adjusted be a time when the communication terminal apparatus 20 has obtained the information about the adjustment. For example, a time included in GNSS radio waves transmitted from the RTK-GNSS satellite 7 illustrated in FIG. 2 is used for the time. Alternatively, a clock IC may be built in the monitor 22 or the communication terminal apparatus 20, and, the time may be obtained by using the clock IC.

Next, in step S105, the management apparatus 40 obtains the adjustment information transmitted from the communication terminal apparatus 20 and writes it in the operation information list LTR of the storage unit 42. For example, the manager on the side of the management apparatus 40 confirms the adjustment information written in the operation information list LTR, and accordingly, the time, the number of times, the adjusted amount, and the adjusted amount cumulative value in which the cumulative value of the amount of operation of the construction machine 1 has been adjusted can be promptly recognized.

When the adjustment information is written in the operation information list LTR of the storage unit 42, the processing unit 41 of the management apparatus 40 may display information indicating that the cumulative value of the amount of operation has been adjusted, for example, on a screen 44MP of the management-side display device 44M of the input/output device 44. In this case, the processing unit 41 can display the adjustment information together with an identifier of the construction machine 1 in which the cumulative value of the amount of operation has been adjusted. In this way, the serviceman on a side of the management apparatus 40 can promptly recognize the construction machine 1 of which the cumulative value of the amount of operation has been adjusted and the adjusted content.

In step S104 described above, the communication terminal apparatus 20 may transmit the adjustment information to a terminal device such as a wirelessly-connected personal computer, a mobile communication terminal apparatus, or a handy terminal. In this case, for example, the terminal 37 connected to the in-vehicle signal line 30 illustrated in FIG. 2 is connected to the terminal device with a communication cable. The terminal device downloads the adjustment information from the communication terminal apparatus 20 via the in-vehicle signal line 30, the terminal 37, and the communication cable. In this case, the terminal device corresponds to the management apparatus 40.

In step S106, the processing unit 22C of the monitor 22 issues a failure notification to the communication terminal apparatus 20 via the in-vehicle signal line 30. The failure notification includes the information about the adjustment transmitted to the communication terminal apparatus 20 in step S103. In step S107, the communication terminal apparatus 20 stores the failure notification from the monitor 22 in the failure storage unit 20MD of the storage unit 20M illustrated in FIG. 2. When the failure notification is stored in the failure storage unit 20MD, the communication terminal apparatus 20 may transmit the content of the failure notification to, for example, the terminal device of an owner or the manager of the construction machine 1 which is not shown. Therefore, the owner or the manager of the construction machine 1 who has received the failure notification can recognize that the cumulative value of the amount of operation has been adjusted immediately after the adjustment.

In step S108, the processing unit 22C of the monitor 22 stores the information about the adjustment to be transmitted to the communication terminal apparatus 20 in step S103 in the failure storage unit 22MD. At this time, the processing unit 22C of the monitor 22 obtains the time, when the cumulative value of the amount of operation has been adjusted, from the communication terminal apparatus 20 and stores it in the failure storage unit 22MD together with the information about the adjustment. In this way, the monitor 22 can accumulate history of the adjustment of the amount of operation.

In the first exemplary processing, the monitor 22 performs the processing in an order of step S102, step S103, step S106, and step S108. The communication terminal apparatus 20 performs the processing in an order of step S104 and step S107. The management apparatus 40 performs processing of step S105.

According to the first exemplary processing, the adjustment information and the adjusted time are transmitted to the management apparatus 40 every time when the cumulative value of the amount of operation is adjusted on the side of the construction machine 1. Therefore, the side of the management apparatus 40 can recognize that the cumulative value of the amount of operation has been adjusted. For example, even when the serviceman SV wrongly adjusts the value or when the operator of the construction machine 1 increases the cumulative value of the operating time, the manager on the side of the management apparatus 40 can recognize the timing of the adjustment or the increase in the cumulative value of the operating time by looking at the operation information list LTR stored in the storage unit 42 of the management apparatus 40. Accordingly, the manager can promptly cope with the situation.

<Second Exemplary Processing in a Case where the Cumulative Value of the Amount of Operation has been Adjusted by Using the Monitor 22>

In the management system 100, the management apparatus 40 can limit a function for adjusting the cumulative value of the amount of operation (refer to as "cumulative value adjusting function" below as necessary) included in the monitor 22 of the construction machine 1. Regarding the monitor 22 of the construction machine 1 having a high frequency in which the cumulative value of the amount of operation is adjusted, it can be estimated that the cumulative value of the amount of operation be unnecessarily adjusted while having some intention or an unsteady state as a background. Therefore, the cumulative value adjusting function is limited by remote control from the management apparatus 40. For example, the limitation in the cumulative value adjusting function includes not to adjust the cumulative value on the monitor 22. In this way, unnecessary adjustment of the cumulative value with some intention can be avoided.

Figure 4:
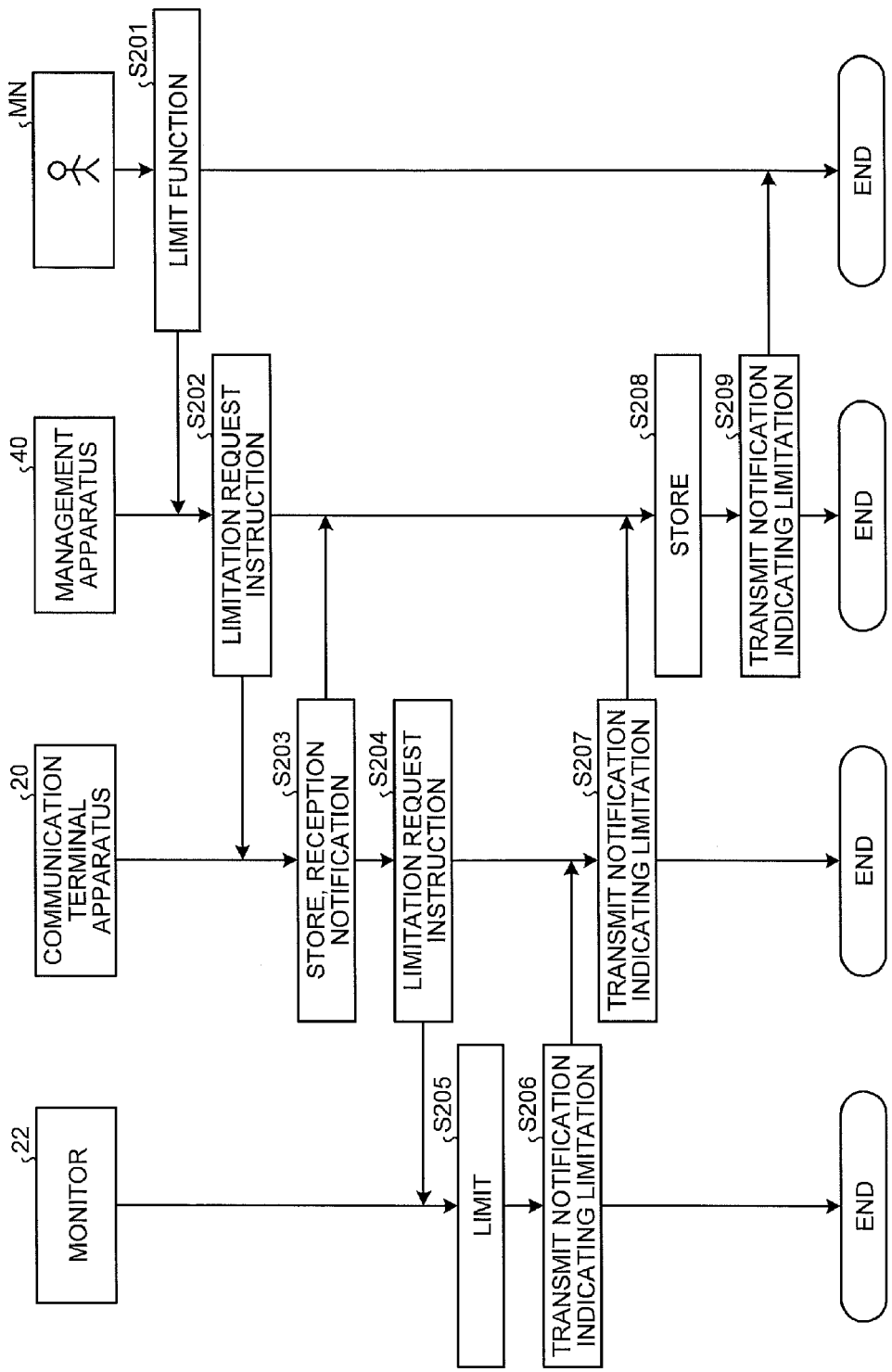
FIG. 4 is a flowchart of a processing procedure of processing in which adjustment of the cumulative value of the amount of operation on the monitor is limited.
Figure 5:
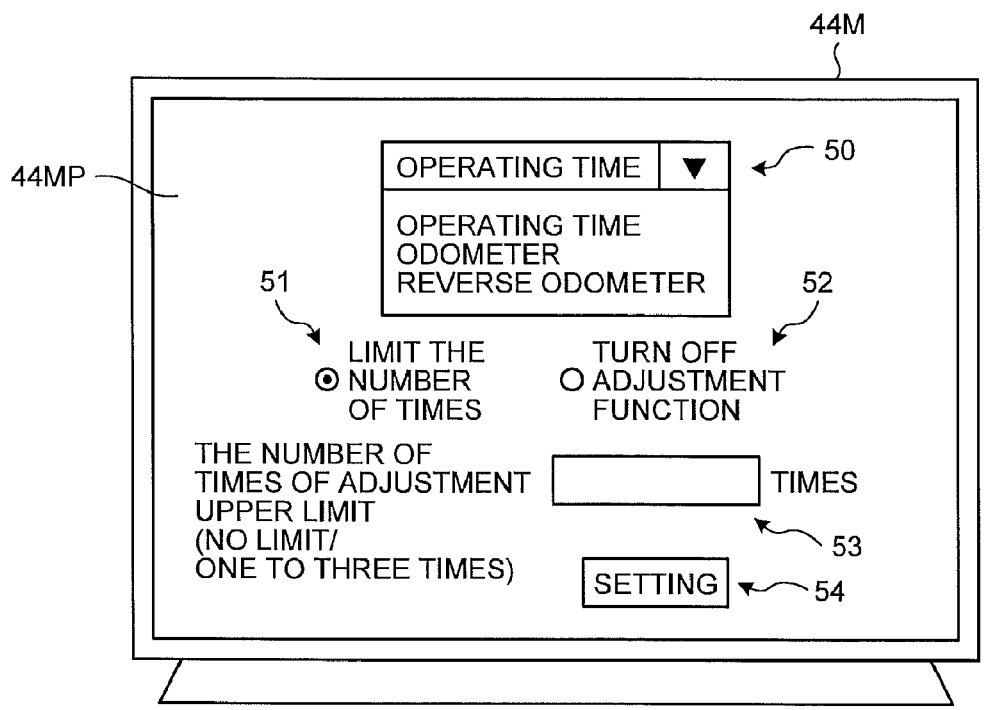
FIG. 5 is a diagram of a screen of a management-side display device included in an input/output device of the management apparatus.

FIG. 4 is a flowchart indicating a processing procedure of processing in which adjustment of the cumulative value of the amount of operation on the monitor 22 is limited. FIG. 5 is a diagram of the screen 44MP of the management-side display device 44M included in the input/output device 44 of the management apparatus 40. In step S201, a manager MN on the side of the management apparatus 40 illustrated in FIG. 2 inputs an instruction from the input/output device 44 on the side of the management apparatus 40. The instruction indicates that the cumulative value adjusting function of the monitor 22 is limited. In the present embodiment, the limitation in the cumulative value adjusting function includes both to turn off the cumulative value adjusting function and to limit the number of times of the adjustments to the cumulative value.

As illustrated in FIG. 5, an object selecting icon 50, a number of times of adjustment limiting icon 51, an adjusting function turning off icon 52, an adjustment upper-limit setting icon 53, and a setting icon 54 are displayed as a limitation setting screen on the screen 44MP of the management-side display device 44M of the input/output device 44. The object selecting icon 50 is used when an object of which the cumulative value adjusting function is limited is selected. The number of times of adjustment limiting icon 51 is selected when the number of times of adjustment of the cumulative value is limited. The adjusting function turning off icon 52 is used when to turn off the cumulative value adjusting function is selected. The adjustment upper-limit setting icon 53 sets an upper limit of the number of times in a case where the number of times to adjust the cumulative value is limited. The setting icon 54 is selected when the instruction to limit the cumulative value adjusting function is transmitted.

The manager MN selects the object of which the cumulative value adjusting function is limited by using the object selecting icon 50. In this example, the function for adjusting the cumulative value of the operating time is limited. The manager MN selects either one of the number of times of adjustment limiting icon 51 or the adjusting function turning off icon 52. In this example, since the number of times of adjustment limiting icon 51 is selected, the number of times of adjustment to the cumulative value of the operating time is limited. When the adjusting function turning off icon 52 is selected, the function for adjusting the cumulative value of the operating time is turned off. Accordingly, the cumulative value of the operating time cannot be adjusted from the monitor 22.

When the number of times of adjustment limiting icon 51 is selected, the manager MN sets an upper limit of the times to limit the number of the adjustments to the cumulative value by using the adjustment upper-limit setting icon 53. In this example, the number of times of adjustment can be selected from one of no upper limit or three times at a maximum. The number of times of adjustment to the cumulative value of the operating time from the monitor 22 is limited by the adjustment upper-limit setting icon 53. When all the selections have been completed, the manager MN selects the setting icon 54. Then, a content of the limitation selected on the limitation setting screen is input to the management apparatus 40 as the instruction to limit the cumulative value adjusting function of the monitor 22.

When the instruction to limit the cumulative value adjusting function of the monitor 22 is input, the processing unit 41 of the management apparatus 40 receives in step S202 a request to limit the cumulative value adjusting function. Then, the processing unit 41 transmits an instruction for requesting to limit the cumulative value adjusting function (referred to as "limitation request instruction" below as necessary) to the communication terminal apparatus 20 of the construction machine 1 via the communication apparatus 103 illustrated in FIG. 2. The limitation request instruction includes a content of the limitation selected on the limitation setting screen. Therefore, the communication terminal apparatus 20 limits the cumulative value adjusting function of the monitor 22 based on the content of the limitation selected on a limit selecting screen.

In step S203, the communication terminal apparatus 20 of the construction machine 1 which has received (obtained) the limitation request instruction makes the spooler 20MS illustrated in FIG. 2 temporarily store the limitation request instruction received from the management apparatus 40. The communication terminal apparatus 20 transmits a notification indicating that the limitation request instruction has been received to the management apparatus 40. When the management apparatus 40 receives (obtains) the notification, the processing unit 41 rewrites the content of the in-processing list LOP of the storage unit 42 to a content indicating that the communication terminal apparatus 20 is performing the processing to limit the cumulative value adjusting function.

Next, in step S204, the communication terminal apparatus 20 transmits the limitation request instruction to the monitor 22 via the in-vehicle signal line 30. In step S205, the processing unit 22C of the monitor 22 which has received (obtained) the limitation request instruction limits the cumulative value adjusting function in accordance with the limitation request instruction. For example, in a case where the limitation request instruction turns off the cumulative value adjusting function, the processing unit 22C does not accept the adjustment even when the operation to adjust the cumulative value is performed. Alternatively, the processing unit 22C does not accept the operation to adjust the cumulative value. When the limitation request instruction limits the number of times of the cumulative value adjusting functions, the processing unit 22C accepts the adjustment to the cumulative value until the upper limit specified by the limitation request instruction. However, the processing unit 22C does not accept the adjustment to the cumulative value which exceeds the upper limit. In this way, when obtaining the instruction, which indicates that the cumulative value cannot be adjusted, transmitted from the management apparatus 40, the processing unit 22C of the monitor 22 is in the state where the cumulative value cannot be adjusted. When obtaining the instruction, which indicates that the number of times of the adjustments to the cumulative value is limited, the processing unit 22C of the monitor 22 limits the number of times of the adjustments to the cumulative value to the number of times specified by the instruction. In this way, unnecessary adjustment of the cumulative value with some intention, for example, falsification of the cumulative value can be avoided.

Next, in step S206, the processing unit 22C of the monitor 22 transmits the notification indicating that the cumulative value adjusting function is limited to the communication terminal apparatus 20 via the in-vehicle signal line 30. In step S207, the communication terminal apparatus 20 which has received (obtained) the notification indicating that the monitor 22 limits the cumulative value adjusting function transmits the notification indicating that the monitor 22 limits the cumulative value adjusting function to the management apparatus 40. When the management apparatus 40 receives (obtains) the notification, the processing unit 41 adds in step S208 information indicating that the cumulative value adjusting function of the monitor 22 of the construction machine 1 has been limited to the operation information list LTR of the storage unit 42. The processing unit 41 rewrites the content of the in-processing list LOP of the storage unit 42 to a content indicating that the communication terminal apparatus 20 has completed the processing for limiting the cumulative value adjusting function. Next, in step S209, the processing unit 41 transmits the notification indicating that the cumulative value adjusting function of the monitor 22 of the construction machine 1 has been limited to the input/output device 44. The management-side display device 44M of the input/output device 44 displays that the cumulative value adjusting function has been limited.

In the second exemplary processing, the monitor 22 performs the processing in an order of step S205 and step S206. The communication terminal apparatus 20 performs the processing in an order of step S203, step S204 and step S207. The management apparatus 40 performs the processing in an order of step S202, step S208, and step S209.

According to the second exemplary processing, the cumulative value adjusting function of the monitor 22 can be limited from the side of the management apparatus 40. Therefore, regarding the construction machine 1 in which the cumulative value of the amount of operation is frequently adjusted and which is suspected that unnecessary adjustment of the cumulative value is performed or to be performed, the cumulative value adjusting function of the monitor 22 can be limited by remote control from the side of the management apparatus 40. Therefore, an unnecessary adjustment act to the cumulative value of the amount of operation can be prevented. Also, since the management apparatus 40 can limit the cumulative value adjusting function of the monitor 22 by the remote control even when a distance between the management apparatus 40 and the construction machine 1 is long, an unnecessary adjustment act can be promptly prevented.

In the present embodiment, the cumulative value adjusting function of the monitor 22 has been limited from the side of the management apparatus 40 (outside). However, it is preferable that the cumulative value adjusting function of the monitor 22 be limited from outside the monitor 22. For example, the cumulative value adjusting function of the monitor 22 may be limited by inputting the instruction to limit the cumulative value adjusting function of the monitor 22 from the input switch 22S (outside) of the monitor 22 illustrated in FIG. 2. In addition, the cumulative value adjusting function of the monitor 22 may be limited according to the input from a terminal device such as a personal computer connected to the monitor 22 via a wired communication, a mobile communication terminal apparatus, or a terminal device such as a handy terminal. In this case, for example, the terminal 37 connected to the in-vehicle signal line 30 illustrated in FIG. 2 is connected to the terminal device with a communication cable. The terminal device limits the cumulative value adjusting function of the monitor 22 via the communication cable, the terminal 37, and the in-vehicle signal line 30. In this case, the terminal device corresponds to the management apparatus 40.

<Third Exemplary Processing in a Case where the Cumulative Value of the Amount of Operation has been Adjusted Using the Monitor 22>

In the management system 100, when the cumulative value of the amount of operation has been adjusted, the management apparatus 40, the communication terminal apparatus 20, and the monitor 22 can correct the adjusted cumulative value of the amount of operation. Thus, since the adjusted cumulative value of the amount of operation can be corrected to the value before the adjustment, the management apparatus 40 can manage the cumulative value of the amount of operation in a correct value. That is, even when the serviceman wrongly has adjusted the cumulative value of the amount of operation or even when the cumulative value of the amount of operation has been adjusted with some intention, the management apparatus 40 can manage the cumulative value of the amount of operation in a corrected accurate value.

Figure 6:
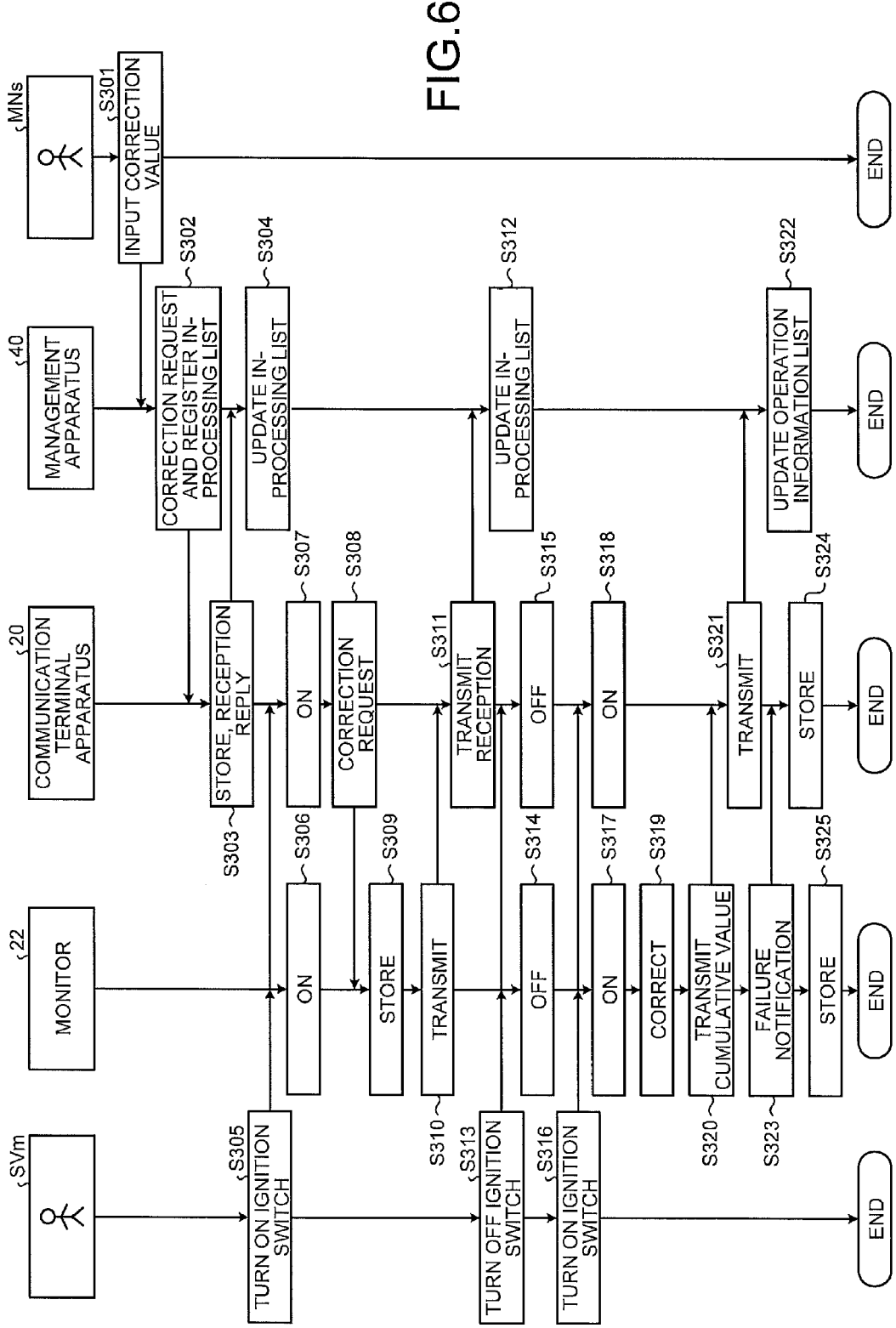
FIG. 6 is a flowchart of a processing procedure of processing in a case where the cumulative value of the amount of operation has been adjusted on the monitor.
Figure 7:
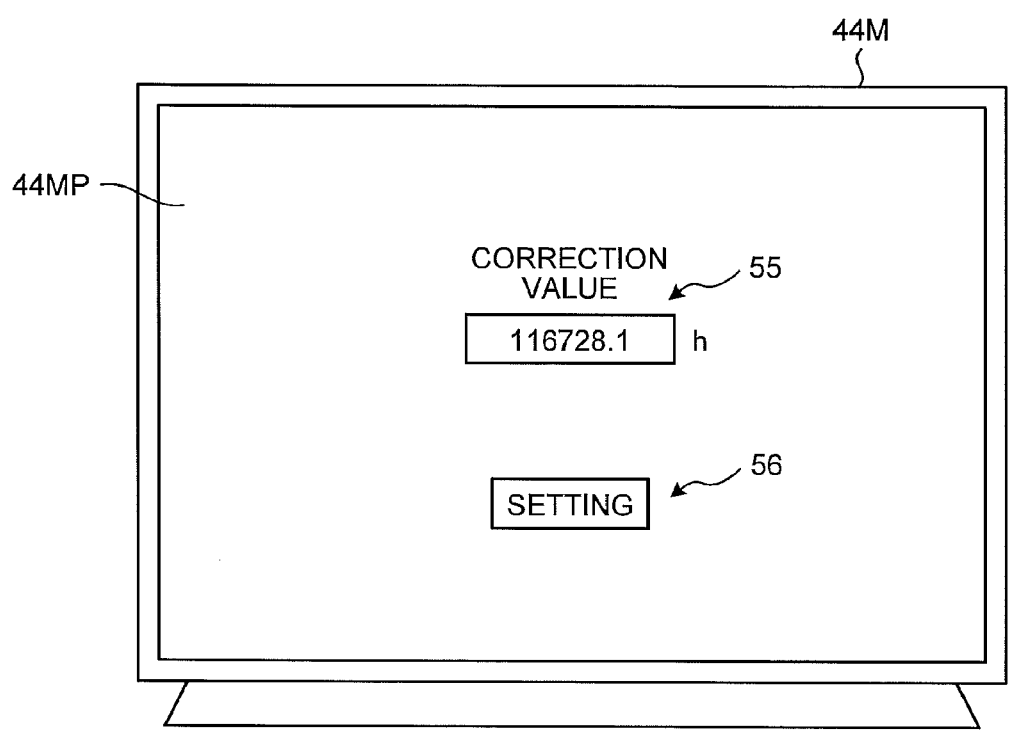
FIG. 7 is a diagram of a screen of the management-side display device included in the input/output device of the management apparatus.

FIG. 6 is a flowchart indicating a processing procedure of processing in a case where the cumulative value of the amount of operation has been adjusted on the monitor 22. FIG. 7 is a diagram of the screen 44MP of the management-side display device 44M included in the input/output device 44 of the management apparatus 40. In step S301, when the cumulative value of the amount of operation is corrected, a manager MNs on the side of the management apparatus 40 illustrated in FIG. 2 inputs a correction value of the cumulative value of the amount of operation from the input/output device 44 on the side of the management apparatus 40. The correction value is, for example, a value before the adjustment to the cumulative value of the amount of operation.

As illustrated in FIG. 7, a correction value inputting icon 55 and a setting icon 56 are displayed on the screen 44MP of the management-side display device 44M of the input/output device 44 as a correction value setting screen. The correction value inputting icon 55 is used to input the correction value. A case where the correction value of the operating time is input as the correction value is illustrated in FIG. 7. The setting icon 56 is selected when the correction value and an instruction to correct the cumulative value of the amount of operation stored in the amount of operation storage unit 22MOP of the storage unit 22M of the monitor 22 to the correction value are transmitted.

The manager MNs inputs the correction value to the correction value inputting icon 55. When the correction value has been input, the manager MNs selects the setting icon 56. Then, the correction value input to the correction value inputting icon 55 is input to the management apparatus 40 as an instruction to correct the cumulative value of the amount of operation stored in the monitor 22 to the correction value, that is, a value specified by the management apparatus 40 (referred to as "correction request" and "correction request instruction" below as necessary).

When the correction request is transmitted from the input/output device 44, the processing unit 41 of the management apparatus 40 receives in step S302 the correction request and transmits the correction request to the communication terminal apparatus 20 of the construction machine 1 via the communication apparatus 103 illustrated in FIG. 2. The correction request transmitted by the management apparatus 40 includes a correction value, that is, a value specified by the management apparatus 40. When receiving (obtaining) the correction request from the management apparatus 40, the communication terminal apparatus 20 makes the monitor 22 correct the cumulative value of the amount of operation stored in the amount of operation storage unit 22MOP to the correction value. When the management apparatus 40 transmits the correction request to the communication terminal apparatus 20, the processing unit 41 of the management apparatus 40 rewrites the content of the in-processing list LOP of the storage unit 42 to a content indicating a state where the correction request has been transmitted to the communication terminal apparatus 20 (register the in-processing list).

In step S303, the communication terminal apparatus 20 of the construction machine 1 which has received the correction request makes the spooler 20MS illustrated in FIG. 2 temporarily store the correction request received from the management apparatus 40. The communication terminal apparatus 20 transmits a notification (reception reply) indicating that the correction request has been received to the management apparatus 40. When the communication apparatus 103 receives (obtains) the notification, the processing unit 41 of the management apparatus 40 rewrites in step S304 the content of the in-processing list LOP of the storage unit 42 to a content indicating that the communication terminal apparatus 20 is performing the correction request (update in-processing list).

Next, in step S305, for example, a serviceman SVm on the side of the construction machine 1 turns ON the key switch 32 of the construction machine 1. Then, in step S306, the power is supplied from the storage battery 24 to the monitor 22, and this starts the monitor 22. In step S307, the power is supplied from the storage battery 24 to the communication terminal apparatus 20, and this starts the communication terminal apparatus 20.

In step S308, the communication terminal apparatus 20 transmits the correction request temporarily stored in the spooler 20MS to the monitor 22 via the in-vehicle signal line 30. In step S309, the processing unit 22C of the monitor 22 which has received (obtained) the correction request makes the storage unit 22M temporarily store the correction request. The correction request is written in a processing list stored in the storage unit 22M. The processing list is a list of processing to be performed by the processing unit 22C of the monitor 22. When the processing unit 22C terminates the processing written in the processing list, the terminated processing is deleted from the processing list. When the correction request is temporarily stored in the storage unit 22M of the monitor 22, the processing unit 22C transmits in step S310 the notification indicating that the monitor 22 has received the correction request to the communication terminal apparatus 20 via the in-vehicle signal line 30.

In step S311, the communication terminal apparatus 20 which has received (obtained) the notification indicating that the monitor 22 has received the correction request transmits the notification to the management apparatus 40. When the management apparatus 40 receives (obtains) the notification, the processing unit 41 rewrites in step S312 the content of the in-processing list LOP of the storage unit 42 to a content indicating a state where the monitor 22 has received the correction request.

In step S313, for example, the serviceman SVm on the side of the construction machine 1 turns OFF the key switch 32 of the construction machine 1. Then, in step S314, the power supply to the monitor 22 is stopped, and this stops the monitor 22. In step S315, the power supply to the communication terminal apparatus 20 is stopped, and this stops the communication terminal apparatus 20.

In step S316, after the monitor 22 has received the correction request, for example, the serviceman SVm on the side of the construction machine 1 turns ON the key switch 32 of the construction machine 1 again. Then, in step S317, the power is supplied from the storage battery 24 to the monitor 22, and this starts the monitor 22. In step S318, the power is supplied from the storage battery 24 to the communication terminal apparatus 20, and this starts the communication terminal apparatus 20. The start of the monitor 22 in step S317 and the start of the communication terminal apparatus 20 in step S318 are the first start after the monitor 22 has received the correction request.

In step S319, the cumulative value of the amount of operation stored in the amount of operation storage unit 22MOP of the storage unit 22M of the monitor 22 is corrected. Specifically, the processing unit 22C of the monitor 22 performs the correction request temporarily stored in the storage unit 22M and makes the amount of operation storage unit 22MOP of the storage unit 22M store the correction value included in the correction request. According to this processing, the cumulative value of the amount of operation at the current time stored in the amount of operation storage unit 22MOP of the storage unit 22M is rewritten to the correction value included in the correction request and corrected.

According to this processing, the monitor 22 is adjusted by the operator of the construction machine 1 or the serviceman SVm on the side of the construction machine 1, and the cumulative value of the amount of operation at the current time stored in the amount of operation storage unit 22MOP can be corrected to the value before the adjustment.

As a result, even when the cumulative value of the amount of operation has been wrongly stored in the amount of operation storage unit 22MOP or even when an unnecessary adjustment to the cumulative value has been performed with some intention, the cumulative value of the amount of operation stored in the amount of operation storage unit 22MOP can be corrected to the correct value from the side of the management apparatus 40, that is, outside the construction machine 1.

When the correction value included in the correction request is stored in the amount of operation storage unit 22MOP of the storage unit 22M, the processing unit 22C transmits in step S320 a new cumulative value of the amount of operation stored in the amount of operation storage unit 22MOP to the communication terminal apparatus 20 via the in-vehicle signal line 30. The new cumulative value of the amount of operation transmitted in step S320 is a correction value. In step S321, the communication terminal apparatus 20 which has received (obtained) the new cumulative value of the amount of operation transmits it to the management apparatus 40.

When the management apparatus 40 receives (obtains) the new cumulative value of the amount of operation, the processing unit 41 rewrites the cumulative value of the amount of operation in the operation information list LTR stored in the storage unit 42 to the new cumulative value of the amount of operation and updates the operation information list LTR in step S322. The processing unit 41 rewrites the content of the in-processing list LOP of the storage unit 42 to a content indicating that the monitor 22 and the communication terminal apparatus 20 have completed the processing for correcting the cumulative value of the amount of operation.

Next, in step S323, the processing unit 22C of the monitor 22 issues a failure notification to the communication terminal apparatus 20 via the in-vehicle signal line 30. The failure notification includes the new cumulative value of the amount of operation to be transmitted to the communication terminal apparatus 20, that is, the correction value in step S320. In step S324, the communication terminal apparatus 20 stores the new cumulative value of the amount of operation transmitted from the monitor 22 in the failure storage unit 20MD of the storage unit 20M illustrated in FIG. 2. The failure notification may be transmitted to, for example, the terminal device, which is not shown, of the owner or the manager of the work machine 1. According to the processing, the owner of the construction machine 1 who has received the failure notification can promptly recognize that the cumulative value of the amount of operation stored in the amount of operation storage unit 22MOP of the monitor 22 has been corrected to the correct value.

In step S325, the processing unit 22C of the monitor 22 stores the new cumulative value of the amount of operation in the failure storage unit 22MD. At this time, the processing unit 22C of the monitor 22 obtains, for example, the time when the communication terminal apparatus 20 has transmitted the new cumulative value of the amount of operation from the communication terminal apparatus 20. Then, the processing unit 22C stores the time in the failure storage unit 22MD together with the new cumulative value of the amount of operation. In this way, the monitor 22 can accumulate the history of the correction of the amount of operation according to the correction request from outside the construction machine 1, for example, the management apparatus 40.

When the cumulative value of the amount of operation stored in the amount of operation storage unit 22MOP in a state where the amount of operation changes is rewritten to the correction value during the operation of the construction machine 1, there is a possibility that the cumulative value of the amount of operation includes an error. In the present embodiment, in a case where the correction request has been received during the operation of the construction machine 1 and when the monitor 22 is started, the monitor 22 rewrites the cumulative value of the amount of operation of the amount of operation storage unit 22MOP to the correction value after the key switch 32 has been turned OFF and turned ON again. That is, after the key switch 32 has been turned ON, the monitor 22 rewrites the cumulative value of the amount of operation of the amount of operation storage unit 22MOP to the correction value before the engine of the construction machine 1 starts operation and the construction machine 1 starts the operation. In this way, the error of the cumulative value of the amount of operation can be reduced.

In step S324, the communication terminal apparatus 20 stores the new cumulative value of the amount of operation, that is, the correction value included in the correction request and an identifier of the correction value, which is to be stored, in the failure storage unit 20MD. Similarly, in step S325, the processing unit 22C of the monitor 22 stores the new cumulative value of the amount of operation, that is, the correction value included in the correction request and the identifier of the correction value, which is to be stored, in the amount of operation storage unit 22MOP. The identifier is used to discriminate the correction request of this time from the other correction request. The identifier is generated by the management apparatus 40 so as to be uniquely determined for each of the plurality of construction machines 1.

After storing the correction value and the identifier, when the communication terminal apparatus 20 and the monitor 22 have received (obtained) the correction request having the same identifier as that of the correction value and the identifier stored in this time, it is assumed that the correction request be resent, and the communication terminal apparatus 20 and the monitor 22 do not accept the correction request. When the cumulative value of the amount of operation has been corrected once according to this processing, the cumulative value is not corrected to the same value. Therefore, the management apparatus 40 can manage the correct cumulative value of the amount of operation.

In the third exemplary processing, the monitor 22 performs the processing in an order of step S306, step S309, step S310, step S314, step S317, step S319, step S320, step S323, and step S325. The communication terminal apparatus 20 performs the processing in an order of step S303, step S307, step S308, step S311, step S315, step S318, step S321, and step S324. The management apparatus 40 performs the processing in an order of step S302, step S304, step S312, and step S322.

According to the third exemplary processing, the cumulative value of the amount of operation stored in the monitor 22 can be corrected by the remote control from the side of the management apparatus 40. Therefore, even when the cumulative value of the amount of operation has been adjusted by an unnecessary act or even when the cumulative value of the amount of operation has been adjusted to the wrong value because of a mistake by the serviceman SVm on the side of the construction machine 1, the cumulative value of the amount of operation stored in the monitor 22 can be corrected to the correct value.

In the present embodiment, the adjusted cumulative value of the amount of operation has been corrected from the side of the management apparatus 40 (outside). However, it is preferable that the adjusted cumulative value of the amount of operation be corrected from outside the monitor 22. For example, the cumulative value of the amount of operation stored in the monitor 22 may be corrected by inputting the correction value of the cumulative value of the amount of operation from the input switch 22S (outside) of the monitor 22 illustrated in FIG. 2. In addition, the cumulative value of the amount of operation may be corrected according to the input from the terminal device such as a personal computer connected to the monitor 22 via a wired communication, a mobile communication terminal apparatus, or a terminal device such as a handy terminal. In this case, for example, the terminal 37 connected to the in-vehicle signal line 30 illustrated in FIG. 2 is connected to the terminal device with a communication cable. The terminal device corrects the cumulative value of the amount of operation via the communication cable, the terminal 37, and the in-vehicle signal line 30. In this case, the terminal device corresponds to the management apparatus 40.

The present embodiment has been described above. However, the present embodiment is not limited to the above-mentioned content. Also, the above-mentioned components include those can be easily assumed by those skilled in the art, those substantially similar to the above-mentioned components, and those within a so-called equivalent range. In addition, the above-mentioned components can be combined as necessary. In addition, at least one of omission, replacement, and change of the components can be performed without departing from the scope of the present embodiment.

REFERENCE SIGNS LIST

1 CONSTRUCTION MACHINE
5 COMMUNICATION SATELLITE
6 BASE STATION
7 RTK-GNSS SATELLITE
20 COMMUNICATION TERMINAL APPARATUS
20C PROCESSING UNIT
20M STORAGE UNIT
20MD FAILURE STORAGE UNIT
20MS SPOOLER
22 MONITOR
22CNT CONTROL APPARATUS
22C PROCESSING UNIT
22M STORAGE UNIT
22MD FAILURE STORAGE UNIT
22MOP AMOUNT OF OPERATION STORAGE UNIT
22P SCREEN
22S INPUT SWITCH
24 STORAGE BATTERY
30 SIGNAL LINE (IN-VEHICLE SIGNAL LINE)
32 KEY SWITCH
34 COMMUNICATION UNIT
35 POSITION DETECTING APPARATUS
36 VARIOUS CONTROL APPARATUSES
40 MANAGEMENT APPARATUS
41 PROCESSING UNIT
42 STORAGE UNIT
43 INPUT/OUTPUT UNIT
44 INPUT/OUTPUT DEVICE
47 CUMULATIVE OPERATING TIME
100 MANAGEMENT SYSTEM
101 COMMUNICATION LINE
103 COMMUNICATION APPARATUS
LOP IN-PROCESSING LIST
LTR OPERATION INFORMATION LIST

The invention claimed is:

1. A construction machine comprising:
a cumulative value storage device configured to store a cumulative value in which an amount of operation of the construction machine is accumulated and have an adjustment function to the stored cumulative value, the cumulative value storage device comprising a memory;
a user input device for adjusting the cumulative value by rewriting the cumulative value stored in the cumulative value storage device at a present moment;
an adjustment existence determining unit configured to determine, based on the cumulative value rewritten by the user input device, whether the cumulative value has been adjusted, the adjustment existence determining unit comprising a processor; and
a communication terminal configured to communicate with a management apparatus outside the construction machine and transmit adjustment information indicating that at least the cumulative value has been adjusted to the management apparatus when the adjustment existence determining unit has determined that the adjustment has been performed,
wherein when the cumulative value storage device obtains a correction request instruction to correct the cumulative value to a value specified by the management apparatus from the management apparatus, the cumulative value storage device corrects the cumulative value stored in the cumulative value storage device to the specified value, and
wherein after the cumulative value storage device obtains the correction request instruction, the cumulative value storage device corrects the cumulative value to the specified value after a key switch of the construction machine has been turned OFF and turned ON again.

2. The construction machine according to claim 1, wherein
the communication terminal further transmits the number of times of the adjustment or a time when the adjustment has been performed.

3. The construction machine according to claim 1, wherein
the adjustment information is at least one of the cumulative value after the adjustment or a difference between a value after the cumulative value has been adjusted and a value before the cumulative value is adjusted.

4. The construction machine according to claim 1, wherein
the communication terminal includes a storage unit configured to store information on failures generated in the construction machine and makes the storage unit store at least the adjustment information.

5. The construction machine according to claim 1, wherein
when the cumulative value storage device obtains a limitation request instruction to limit the adjustment function to the cumulative value from the management apparatus, the cumulative value storage device turns off the adjustment function to the cumulative value.

6. The construction machine according to claim 1, wherein
when the cumulative value storage device obtains a limitation request instruction to limit the number of times to adjust the cumulative value from the management apparatus, the cumulative value storage device limits the number of times to adjust the cumulative value.

7. A construction machine comprising:

a cumulative value storage device configured to store a cumulative value in which an amount of operation of the construction machine is accumulated and have an adjustment function to the stored cumulative value, the cumulative value storage device comprising a memory;

a user input device for adjusting the cumulative value by rewriting the cumulative value stored in the cumulative value storage device at a present moment; and a communication terminal configured to communicate with a management apparatus outside the construction machine, wherein when the cumulative value storage device obtains a limitation request instruction to limit the adjustment function to the cumulative value that is performed using the user input device from the management apparatus, the cumulative value storage device turns off the adjustment function to the cumulative value.

8. A construction machine comprising:

a cumulative value storage device configured to store a cumulative value in which an amount of operation of the construction machine is accumulated and have an adjustment function to the stored cumulative value, the cumulative value storage device comprising a memory;

a user input device for adjusting the cumulative value by rewriting the cumulative value stored in the cumulative value storage device at a present moment; and a communication terminal configured to communicate with a management apparatus outside the construction machine, wherein when the cumulative value storage device obtains a correction request instruction to correct the cumulative value rewritten by the user input device to a value specified by the management apparatus from the management apparatus, the cumulative value storage device corrects the cumulative value stored in the cumulative value storage device to the specified value.

* * * * *